United States Patent [19]

Avera

[11] Patent Number: 4,477,482
[45] Date of Patent: Oct. 16, 1984

[54] PEANUT FLAVORING COMPATIBLE WITH WATER BASED FOOD SYSTEMS

[75] Inventor: F. Lee Avera, Alameda, Calif.

[73] Assignee: Jack W. Kuehn, Sr., Burnsville, Minn.

[21] Appl. No.: 502,010

[22] Filed: Jun. 7, 1983

Related U.S. Application Data

[62] Division of Ser. No. 477,004, Mar. 21, 1983, abandoned.

[51] Int. Cl.$^3$ .......................... A23L 1/36; A23L 1/221
[52] U.S. Cl. ...................................... 426/632; 426/633; 426/650; 426/321
[58] Field of Search ............... 426/632, 633, 650, 653, 426/549, 572, 565, 660, 321

[56] References Cited

U.S. PATENT DOCUMENTS

| | | | |
|---|---|---|---|
| 1,398,352 | 11/1921 | Willison | 426/633 |
| 1,859,206 | 5/1932 | Heisler | 426/633 |
| 2,955,040 | 10/1960 | Avera | 426/633 |
| 3,245,803 | 4/1966 | Baker et al. | 426/633 |
| 3,580,729 | 5/1971 | Darragh et al. | 426/633 |
| 3,903,311 | 9/1975 | Billerbeck et al. | 426/633 |
| 4,062,986 | 12/1977 | Billerbeck et al. | 426/633 |
| 4,152,466 | 5/1979 | Deretchin | 426/633 |

Primary Examiner—Jeanette Hunter
Attorney, Agent, or Firm—Merchant, Gould, Smith, Edell, Welter & Schmidt

[57] ABSTRACT

A peanut flavor composition compatible in aqueous food systems comprises about 40 to 50 wt-% of ground peanuts, about 20 to 25 wt-% of water, about 20 to 25% of an edible polyhydroxy compound, about 14 to 20 wt-% sugar, and an effective flavor enhancing amount of salt.

16 Claims, No Drawings

PEANUT FLAVORING COMPATIBLE WITH WATER BASED FOOD SYSTEMS

FIELD OF THE INVENTION

This application is a continuing application of U.S. Ser. No. 06/477,004, filed Mar. 21, 1983 now abandoned.

The invention relates to a flavoring composition that can be combined in food systems such as candies and confections and in particular in aqueous food systems such as cakes, cookies and ice creams, and others without gravitational instability or the production of off odors, off flavors, an unpleasant texture or mouth feel.

BACKGROUND OF THE INVENTION

The manufacture of flavoring compositions for food products has been an important industry for many years. Natural flavors derived from vegetables, fruits, spices, and other sources have been items of commerce which are combined with other foods in compositions in order to provide pleasing taste and texture for the consumer.

One highly desirable flavor is the flavor of fresh roasted peanuts. The peanut which is the seed or fruit of the peanut plant is an object comprising a mixture of peanut oils and peanut solids. The oils are substantially hydrophobic, fatty materials, which in combination with substantially proteinaceous peanut solids can provide a pleasing peanut flavor and texture to food systems. The substantially hydrophobic peanut oil and the hydrophilic peanut solids provides a substantial problem when peanuts, peanut fragment, peanut butter or other peanut derived products are added to an aqueous base system. Since the aqueous base systems can mix poorly with the hydrophobic (water hating) lipid and protein matter, an unstable system can be created in which the hydrophobic lipid and the hydrophilic protein tends to separate from the aqueous system. The separation of the hydrophilic and hydrophobic peanut components can result in unpleasant odors, flavors and texture. These problems can result from both the physical separation of components and from microbiological deterioration.

One attempt to solve the problems of combining peanuts in food systems involves separating the peanut oil from the proteinaceous peanut solids and combining the separate component in the food system. However the separation of peanut oil from peanut solids can substantially reduce the peanut flavor since the mixture of the oil and the solids is required to produce the satisfying peanut flavor. Accordingly, a substantial need exists to provide a peanut flavoring that is compatible with aqueous food systems which is gravitationally stable, which resists the creation of off odors, off flavors, and a clay-like texture or consistency.

BRIEF DESCRIPTION OF THE INVENTION

I have discovered a peanut flavoring composition that is compatible with aqueous food systems which provides a robust, satisfying peanut flavor to a variety of foods, which comprises about 40 to 50 wt-% of roasted blanched ground peanuts, about 20 to 25 wt-% water, about 35 to 50 wt-% of the water soluble peanut protein present, or 20-25 wt-% of the total as polyhydroxy compound, about 14 to 20 wt-% of sugar, and a flavor enhancing amount of salt. I have found that unexpectedly, the peanut flavoring formula releases a greater quantity of a pleasing peanut flavor into an aqueous food system than an equal amount of untreated ground peanuts. While we do not wish to be held to a theory of action, we believe that each of the components of the flavoring cooperate with peanuts in order to create aqueous food system compatibility in a hydrophilic system. By combining ground roasted peanuts with water, a polyhydroxy compound, and sugar, the basic character of the peanut flavoring composition, originally substantially hydrophobic, becomes partly hydrophilic. The hydroxyl groups of the sugar molecules and the polyhydroxy compound apparently renders the hydrophobic nature of the peanut oil at least partly hydrophilic.

The product appears to be a soft, gravitationally stable, pleasing peanut flavoring for food systems and particularly for aqueous foods.

DETAILED DESCRIPTION OF THE INVENTION

Briefly, the peanut flavoring composition of the invention comprises ground blanched roasted peanuts, water, an edible polyhydroxy compound, sugar, and salt.

Peanuts, peanut fragments, and ground roasted blanched peanuts are articles of commerce and are commonly available commodity products. A preferred peanut ingredient is ground roasted peanuts, and a most preferred peanut ingredient is blanched, ground, roasted peanuts for reasons of flavor and quality.

Edible polyhydroxy compounds that can be used in the invention are compounds having at least 3 hydroxyl groups and at least 3 carbon atoms. The simplest polhydroxy compound is glycerol (1,2,3-trihydroxy propane). Other polyhydroxy compounds include tetritols, including erythritol, threitol, pentatols such as ribotol, arabitol, hexitols including sorbitol (d-glucitol), mannitol, and others. Polyhydroxy alcohol compounds can occur in both cyclic and straight chain molecules. A preferred polyhydroxy alcohol compound for use in the invention comprises d-sorbitol. For a thorough discussion of polyhydric alcohols, see *Kirk-Othmer Encyclopedia of Chemical Technology*, 2nd Edition, Vol. 1, pp. 569–588.

Sugar or carbohydrate sweeteners that can be used in making the novel peanut flavoring of the invention include commonly available mono and disaccharide sweeteners including fructose, glucose, sucrose, honey, invert sugar, mixtures thereof and others. It appears that the hydroxyl groups of the sugar molecules cooperate with the polyhydroxy alcohol compound in providing the peanut flavoring composition with its aqueous food system compatibility. We have found that a preferred combinatin of sucrose and invert sugar in combination with the polyhydroxy alcohol compound provides an optimized aqueous compatibility and desirable sweetness flavor. The peanut flavoring can contain water and salt in sufficient quantity to produce a smooth easily handled peanut flavoring with a flavor potentiated by an effective amount of salt. A preferred sugar sweetener comprises a mixture of invert sugar and sucrose, for reasons of blendability and cost.

In somewhat greater detail the peanut flavoring having compatiblity with aqueous food systems comprises and effective peanut flavor providing amount of roasted, blanched and ground peanuts, sufficient water to dissolve the water-soluble salts present in the total product and provide a product that can be easily handled and easily wetted by aqueous foods, sufficient polyhydroxy alcohol compound and carbohydrate sugar, to enhance aqueous food system compatibility, and a flavor potentiating amount of salt. I have determined that the peanut flavoring composition of this invention should comprise about 40 to 50 wt-% of ground peanuts composition. Less than about 40 wt-% and the flavoring composition can have insufficient flavor to satisfy most consumers. If the peanut composition contains greater than about 50 wt-% of peanuts, the flavoring composition can have insufficient compatibility with aqueous foods. The novel peanut flavoring composition of the invention contains about 35 to 45 wt-% total of both polyhydroxy alcohol compound and carbohydrate sugar. Commonly the flavoring composition will contain 20 to 25 wt-% of polyhydroxy alcohol compound and about 14 to 20 wt-% of carbohydrate sugar. Sufficient water is added to the mixture to dissolve the soluble solids in order to provide a flavoring composition that is easily handled and which mixes rapidly in aqueous systems. Commonly the flavoring composition contains about 20 to 25 wt-% of water. Optionally the composition can contain a flavor potentiator such as salt in a concentration of about 0.2 to 1.5 wt-%.

The individual components of the novel peanut flavoring can be combined in any order to form the peanut flavoring composition of the invention, however I have discovered that the components are most conveniently and preferably combined in a two-step process which comprises first blending the polyhydroxy alcohol compound, the carbohydrate sugar compound, the flavor potentiator in the water until the mixture is dispersed or dissolved, and then adding the aqueous solution to the roasted blanched and ground peanuts.

The described peanut flavoring composition of this invention can be used in essentially any food composition dry mix or protein concentrate in which peanut flavoring is desirable. Such food systems include peanut flavored candies; peanut flavored chips; peanut flavored syrups; soft drinks; instant drinks; breakfast combinations (hot or cold); gelatins; pastries such as bread, pies, cakes, brownies, doughnuts, turnovers, sandwiches, breads, rolls, dry mixes, etc.; frozen confections such as popsicles, snow cones, sherbets, soft serve; jams, jellies; soups; ice creams such as peanut flavored ice cream, chocolate peanut flavored ice cream, banana peanut flavored ice cream, etc.; candies such as peanut flavored cream chocolates, peanut flavored coconut bars, etc.; liquors cordials; and others.

The peanut flavoring composition can also be used in non-food areas such as in producing pleasant scent, in masking the unpleasant flavor of medicine or in hiding the odor or flavor of pest control agents.

The following Examples point out specific embodiments of the invention and disclose a best mode.

EXAMPLE I

Into a 1 quart stainless steel mixing bowl was added 14.2 parts by weight of invert sugar (an equimolar mixture of glucose and fructose commonly made by hydrolyzing sucrose), 0.7 parts by weight of sucrose, 21.0 parts by weight of sorbitol, 0.5 parts by weight of sodium chloride, and 21.4 parts by weight of water. The mixture was agitated using a rotary kitchen mixer until the solid substances were dissolved. The aqueous mixture was allowed to stand until entrained air had left solution.

Into another 1 quart stainless steel mixing bowl was placed 42.2 parts by weight roasted, blanched and finely ground peanuts. Into the tank was placed the aqueous solution formed above which was combined with the roasted, blanched finely ground peanuts using the rotary mixer. The mixture was agitated until it reached a smooth blended consistency and appeared to be a light yellow creamy substance with a robust pleasant peanut flavor.

EXAMPLE II

Into a 1 quart stainless mixing bowl was placed 14.2 parts by weight of invert sugar, 0.7 parts by weight of sucrose, 21.07 parts by weight of sorbitol, 1.0 part by weight of sodium chloride, and 20.83 parts by weight of water. The mixture was agitated using a hand held rotary kitchen mixer until the solid ingredients were fully dissolved. The aqueous mixture was permitted to stand until entrained air had left solution.

Into another 1 quart stainless steel mixing bowl was placed 42.2 parts by weight or roasted, blanched and finely ground peanuts and the mixture was blended using the hand held kitchen mixer until smooth. The resulting product appeared to be a light, yellow-tan, creamy, smooth material having a robust, pleasant peanut flavor.

The above discussion and Examples provide a substantial disclosure of the invention, however since many variations of the invention can be made without departing from the spirit and scope of the invention, the invention resides solely in the claims hereinafter appended.

I claim:

1. A hydrophilic peanut flavoring composition that is compatible with aqueous food systems which comprises about 40 to 50 wt-% ground peanuts with its peanut oil, about 20 to 25 wt-% of a polyhydroxy alcohol compound, about 14 to 20 wt-% of a sugar, and about 20–25 wt-% water, wherein the polyhydroxy alcohol compound and the sugar act to increase the hydrophilicity of the peanut oil.

2. The peanut flavoring composition of claim 1 wherein the roasted ground peanuts is in the form of a suspension of ground peanut solids in peanut oil.

3. The peanut flavoring composition of claim 1 wherein the polyhydroxy alcohol compound comprises glycerine or mannitol.

4. The peanut flavoring composition of claim 1 wherein the polyhydroxy alcohol compound comprises sorbitol.

5. The peanut flavoring composition of claim 1 wherein the carbohydrate sugar compound comprises glucose, fructose, sucrose, or mixtures thereof.

6. The peanut flavoring composition of claim 1 wherein the peanut flavoring composition comprises about 20 to 25 wt-% water.

7. The peanut flavoring composition of claim 1 wherein the peanut flavoring composition comprises 0.2 to 0.5 wt-% salt.

8. The peanut flavoring composition of claim 1 wherein the carbohydrate sugar compound comprises a mixture of sucrose and invert sugar at a ratio of about 10 to 40 parts of invert sugar per part of sucrose.

9. The hydrophilic peanut flavoring composition of claim 1 that is compatible with aqueous food systems which comprises 40 to 45 wt-% roasted, blanched and ground peanuts in the form of a suspension of peanut solids in peanut oil, 20 to 22 wt-% water, 20 to 22 wt-% sorbitol, 12 to 16 wt-% invert sugar, 0.5 to 1.0 wt-% sucrose, and 0.1 to 1.0 wt-% salt.

10. A method for making a peanut flavoring composition which is compatible with aqueous food systems which comprises:
 (a) blending 20 parts of potable water with about 20 to 25 parts sorbitol, about 14 to 20 parts carbohydrate sugar, and a flavor potentiating amount of salt to form an aqueous solution; and
 (b) mixing the aqueous solution with about 30 to 60 parts of roasted, blanched ground peanuts.

11. The method of claim 10 wherein the carbohydrate sugar compound comprises glucose, fructose, sucrose or mixtures thereof.

12. The method of claim 10 wherein the carbohydrate sugar compound comprises a mixture of invert sugar and sucrose at a ratio of about 10 to 40 parts of invert sugar per part of sucrose.

13. The method of claim 10 wherein the polyhydroxy alcohol compound comprises sorbitol.

14. A peanut flavored ice cream which comprises an ice cream base and the peanut flavoring composition of claim 1.

15. A peanut flavored pastry composition which comprises a pastry base and the peanut flavoring composition of claim 1.

16. A peanut flavored confection that comprises a confection base and the peanut flavoring composition of claim 1.

* * * * *